US009411574B2

(12) United States Patent
Kostadinov et al.

(10) Patent No.: US 9,411,574 B2
(45) Date of Patent: Aug. 9, 2016

(54) SYSTEM AND METHOD FOR UPDATING FIRMWARE ACROSS DEVICES IN A PROCESS FACILITY

(71) Applicant: Dresser, Inc., Addison, TX (US)

(72) Inventors: Vladimir Dimitrov Kostadinov, Sharon, MA (US); Larry Gene Schoonover, Falmouth, MA (US); Anatoly Podpaly, Sharon, MA (US)

(73) Assignee: Dresser, Inc., Addison, TX (US)

( * ) Notice: Subject to any disclaimer, the term of this patent is extended or adjusted under 35 U.S.C. 154(b) by 271 days.

(21) Appl. No.: 13/970,253

(22) Filed: Aug. 19, 2013

(65) Prior Publication Data

US 2015/0052512 A1    Feb. 19, 2015

(51) Int. Cl.
*G06F 12/00* (2006.01)
*G06F 13/00* (2006.01)
*G06F 13/28* (2006.01)
*G06F 9/445* (2006.01)

(52) U.S. Cl.
CPC ........................................ *G06F 8/65* (2013.01)

(58) Field of Classification Search
CPC ........................................................ G06F 8/65
USPC ........................................................ 711/103
See application file for complete search history.

(56) References Cited

U.S. PATENT DOCUMENTS

| 6,377,859 | B1 | 4/2002 | Brown et al. |
| 6,513,132 | B1 * | 1/2003 | Suzuki ........................ 714/38.1 |
| 6,584,559 | B1 | 6/2003 | Huh et al. |
| 6,754,723 | B2 * | 6/2004 | Kato ................................ 710/8 |
| 7,035,693 | B2 | 4/2006 | Cassiolato et al. |
| 7,263,546 | B1 | 8/2007 | Kostadinov |
| 7,580,987 | B2 | 8/2009 | Kostadinov |
| 7,987,449 | B1 * | 7/2011 | Marolia .................... G06F 8/68 709/220 |
| 2003/0182414 | A1 * | 9/2003 | O'Neill ........................ 709/223 |
| 2004/0030768 | A1 * | 2/2004 | Krishnamoorthy et al. .. 709/223 |
| 2004/0215755 | A1 * | 10/2004 | O'Neill ........................ 709/223 |
| 2008/0028046 | A1 * | 1/2008 | Ushiki .......................... 709/219 |
| 2008/0092132 | A1 * | 4/2008 | Stuber et al. ................. 717/173 |
| 2008/0288771 | A1 * | 11/2008 | Kulakowski et al. ......... 713/150 |
| 2009/0228611 | A1 * | 9/2009 | Ferguson et al. ................ 710/8 |
| 2010/0058322 | A1 | 3/2010 | Oikawa et al. |
| 2012/0298434 | A1 * | 11/2012 | Khouw et al. ............... 180/68.3 |

(Continued)

OTHER PUBLICATIONS

Stany, "MacOSX: Trimming Fat From Mach-O Fat Files", Theconsultant.net, Sep. 6, 2005, pp. 1-4.
Thompson, "The Mac's Move to Intel", Dr. Dobb's Journal, Oct. 1, 2005, pp. 1-4.

(Continued)

*Primary Examiner* — Sheng-Jen Tsai
(74) *Attorney, Agent, or Firm* — Paul Frank + Collins P.C.

(57) ABSTRACT

Embodiments of a system and method to update firmware across multiple devices in a process facility using a single domain of a FOUNDATION Fieldbus protocol. In one embodiment, the system has a receiving device that couples with a pair of target devices, e.g., a first target device and a second target device. The receiving device includes operating instructions that can process an input and generate an output. The input comprises data comprising a first firmware component and a second firmware component for, respectively, the first target device and the second target device. The receiving device can direct the firmware component to the appropriate target device; generating a first output and a second output that distribute the firmware components to complete the upgrade process.

17 Claims, 12 Drawing Sheets

(56) References Cited

U.S. PATENT DOCUMENTS

2013/0067599 A1* 3/2013 Raje et al. .................. 726/29
2013/0179870 A1   7/2013 Kelso et al.
2013/0232478 A1* 9/2013 Jeon ........................... 717/170

OTHER PUBLICATIONS

European Search Report and Written Opinion issued in connection with corresponding EP Application No. 14181254.5-1954 on Nov. 20, 2014.

* cited by examiner

SYSTEM AND METHOD FOR UPDATING FIRMWARE ACROSS DEVICES IN A PROCESS FACILITY

BACKGROUND

The subject matter disclosed herein relates to industrial process facilities and, in particular, to techniques to expedite processes that update executable instructions (e.g., software, firmware, etc.) across various devices found in the facility and/or process lines.

Industrial factories utilize many varieties of devices to control and regulate the operation of a process (e.g., refining fuel). These devices often include executable instructions in the form of, for example, firmware, software, and computer programs that instruct the operation of the device. Implementation of these devices may require that the executable instructions undergo changes, or updates, that are meant to improve operation of the device. These updates, while necessary, can require significant bandwidth and time to complete over the networking protocols common to plants and factory automation.

BRIEF SUMMARY OF THE INVENTION

The discussion below describes embodiments that facilitate the update process within the operating specifications of networking protocols that process facilities use to communicate with devices across process lines. These embodiments can update firmware across multiple devices in the process facility using a single domain of a FOUNDATION Fieldbus™ protocol. In one embodiment, these processes operate on a system that includes a receiving device and one or more target devices, e.g., a first target device and a second target device. Examples of the target devices include control valves with operative hardware that utilizes executable instructions to modulate the flow of working fluids. The receiving device includes operating instructions that can process an input and generate an output. In one implementation, the input comprises data that comprises a first firmware component and a second firmware component for, respectively, the first target device and the second target device. The receiving device can direct the firmware component to the appropriate target device; generating a first output and a second output that distribute the firmware components to complete the update process.

BRIEF DESCRIPTION OF THE DRAWINGS

Reference is now made briefly to the accompanying figures, in which.

Where applicable, like reference characters designate identical or corresponding components and units throughout the several views, which are not to scale unless otherwise indicated.

DETAILED DISCUSSION

Figure 1:
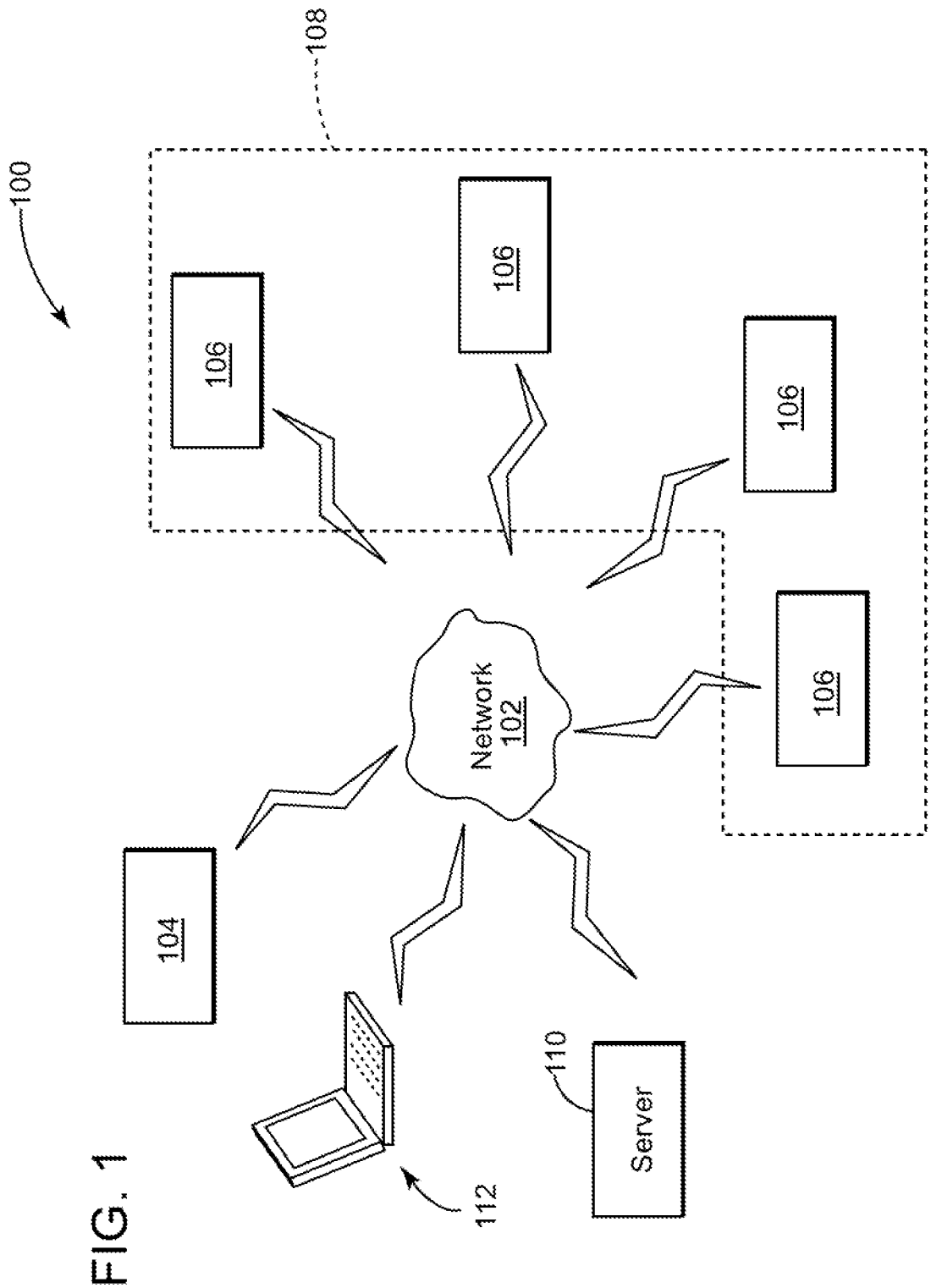
FIG. 1 depicts a schematic diagram of an exemplary embodiment of a system that can update firmware across multiple devices.

FIG. 1 depicts a schematic diagram of an exemplary system 100 for use to communicate updates in executable instructions (e.g., firmware, software, computer programs, etc.) among components in a process facility or plant. The system 100 includes a network 102 that can deploy various wired and wireless constructions, as desired, to facilitate the exchange of data and information among the components. Examples of these components include a host device 104 (also, "central processing device 104") that manages operation of the components to execute a process (e.g., refining process) in the process facility. The host device 104 can communicate, e.g., via network 102, with one or more process devices 106 that are part a process line 108. In one implementation, the system 100 may incorporate one or more external servers (e.g., a first external server 110) and one or more terminals (e.g., a first terminal 112). Examples of the terminal 112 can include a variety of computing devices (e.g., personal computers, workstations, laptop computers, tablet computers, smartphones, etc.) that an end user can utilize to interface with the host device 104 and/or the process device 106.

As discussed more herein, the system 100 can perform an instruction update across the process devices 106 in the process line 108. Examples of the process devices 106 can include control valves with a valve positioner that uses executable instructions to modulate the flow of working fluid. Unlike conventional techniques, however, this instruction update forgoes serial distribution of the updates to the process devices 106 in lieu of a methodology that distributes different instructions (also "firmware") to different devices in parallel, all within the normal channels of communication present on the network 102. This feature can expedite the process time to distribute and install revised and updated versions of firmware.

Figure 2:
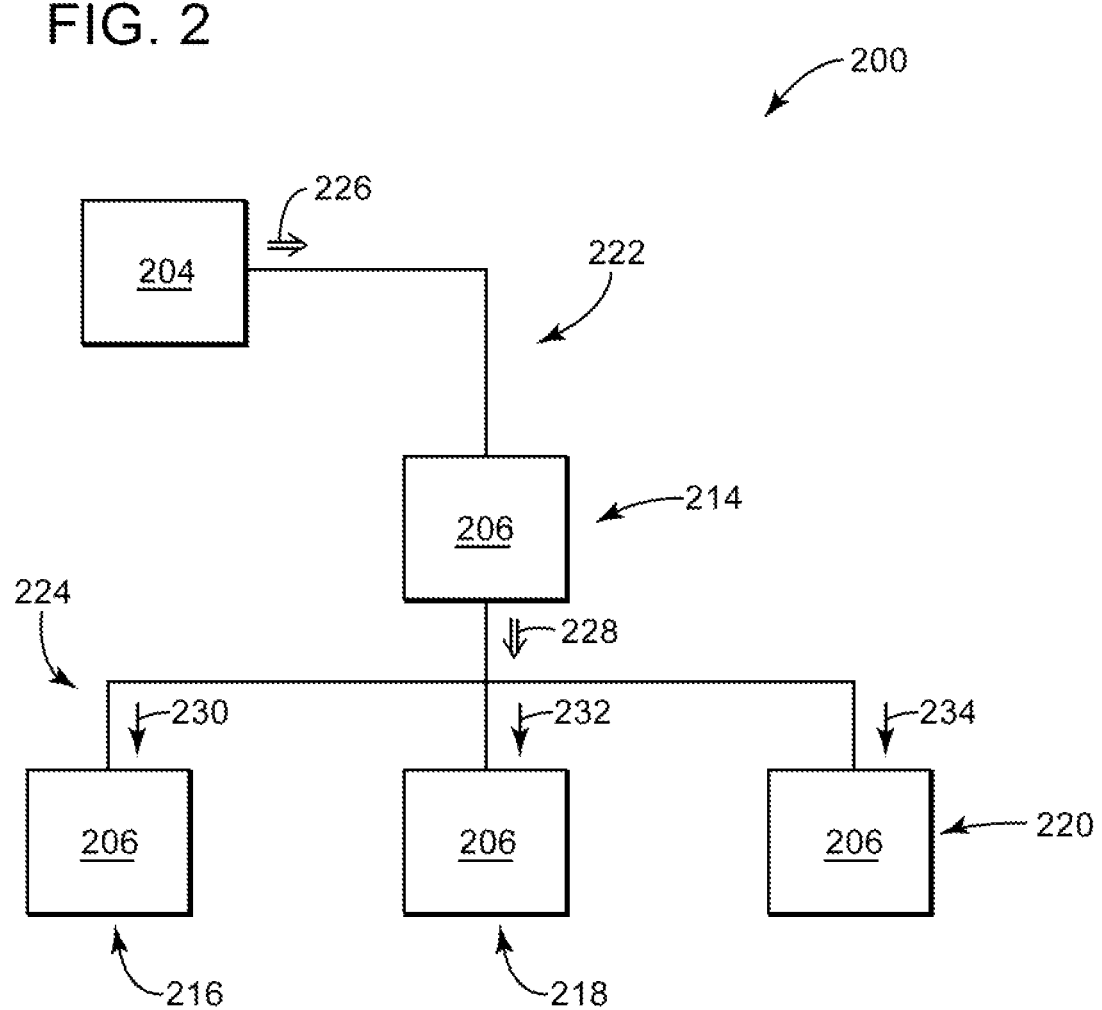
FIG. 2 depicts a schematic diagram of an exemplary embodiment of a system utilizing a first configuration of components to update firmware across multiple devices.

FIGS. 2, 3, 4, and 5 depict an example of a system 200 to help visualize the update process across numerous components of a process line or system. In FIG. 2, the host device 204 couples with a receiving device 214, which can be a device selected from among the plurality of process devices 206. The receiving device 214 couples with a plurality of target devices (e.g., a first target device 216, a second target device 218, and a third target device 220). The target devices can also be one or more of the process device 206. The system 200 also includes one or more network sections (e.g., a first network section 222 and a second network section 224). The network sections 222, 224 can convey data and information, e.g., in the form of an update input 226 and an update output 228 that delivers one or more firmware components (e.g., a first firmware component 230, a second firmware component 232, and a third firmware component 234) to the target devices 216, 218, 220, respectively. This disclosure further contemplates configurations of the firmware components that include more than three firmware components, e.g., including n number of firmware components as required.

The network sections 222, 224 can employ various communication formats, or protocols, that are common to industrial process settings. Examples of these protocols include HART protocol (also, Highway Addressable Remote Transducer Protocol) and FOUNDATION Fieldbus protocol, both of which can serve as the base-level networking protocol for factory automation. For purposes of the discussion herein, the network sections 222, 224 can utilize different protocols; although the techniques this disclosure contemplates can apply to any variety of configurations of the network sections 222, 224. In one example, the first network section 228 uses FOUNDATION Fieldbus protocol to allow the host device 204 to communicate with the receiving device 214. The second network section 230 can use the HART protocol to exchange data between the receiving device 220 and the target devices 216, 218, 220. This disclosure also contemplates use of the proposed instruction update with other protocols, e.g., OPC, that define interoperability among different devices.

In direct contrast to prior systems, implementations of the system 200 deploy updates to executable instructions found on multiple target devices (e.g., the target devices 216, 218, 220) using a single domain of the FOUNDATION Fieldbus protocol. In one embodiment, the receiving device 214 includes executable instructions (also "operating instructions") that can generate outputs in response to the update input from the host device 204. The update input can transmit updates for the executable instructions (also, "firmware updates") found on each of the target devices 216, 218, 220. The operating instructions configure the receiving device 214 to process the input, identifying from the data in the input the firmware update and the associated target device. During operation, for example, the receiving device can identify a first firmware update, a second firmware update, and a third firmware update that the receiving device is to distribute to, respectively, the first target device 216, the second target device 218, and the third target device 220.

In one implementation, the host device 204 can exchange information with the receiving device 214 (and the target devices 216, 218, 220) to query the status of the device. This exchange can, for example, allow the host device 204 to collect data about the status of updates that occur across the system 100. The host device 204 can build a listing of devices that aggregates the information about the update and, also, about the operation of each of the devices 214, 216, 218, 220. Examples of this information can include information about the firmware on each device, information about whether certain updates (including upload and download of executable instructions) is complete, when the last update was completed, etc. This query feature can use various parameters to convey information; in one example, the parameters convey certain state information between the devices of the system 100. Examples of the state information include NO NEW FIRMWARE; FIRMWARE IS READY, FIRMWARE IS IN PROGRESS, and FIRMWARE IS ACTIVE AND RUNNING.

Examples of the system 200 can deploy updates on a device-by-device basis as well as according to groups of devices (also "device family"). For configurations of the system 100 in which the target devices 216, 218, 220 require different executable instructions, the firmware components 230, 232, 234 can convey different information to the associated target device 216, 218, 220. In some implementations, several of the target devices 216, 218, 220 may utilize the same executable instructions and, thus, require the same updates to those executable instructions (e.g., firmware component 230 conveys the same information as firmware component 232, which is different from the information from the information of firmware component 234). The target devices 216, 218 may form a first device family and the target device 220 may form a second device family, the designation of which can determine the configuration of executable instruction that is used to complete the update process.

Figure 3:
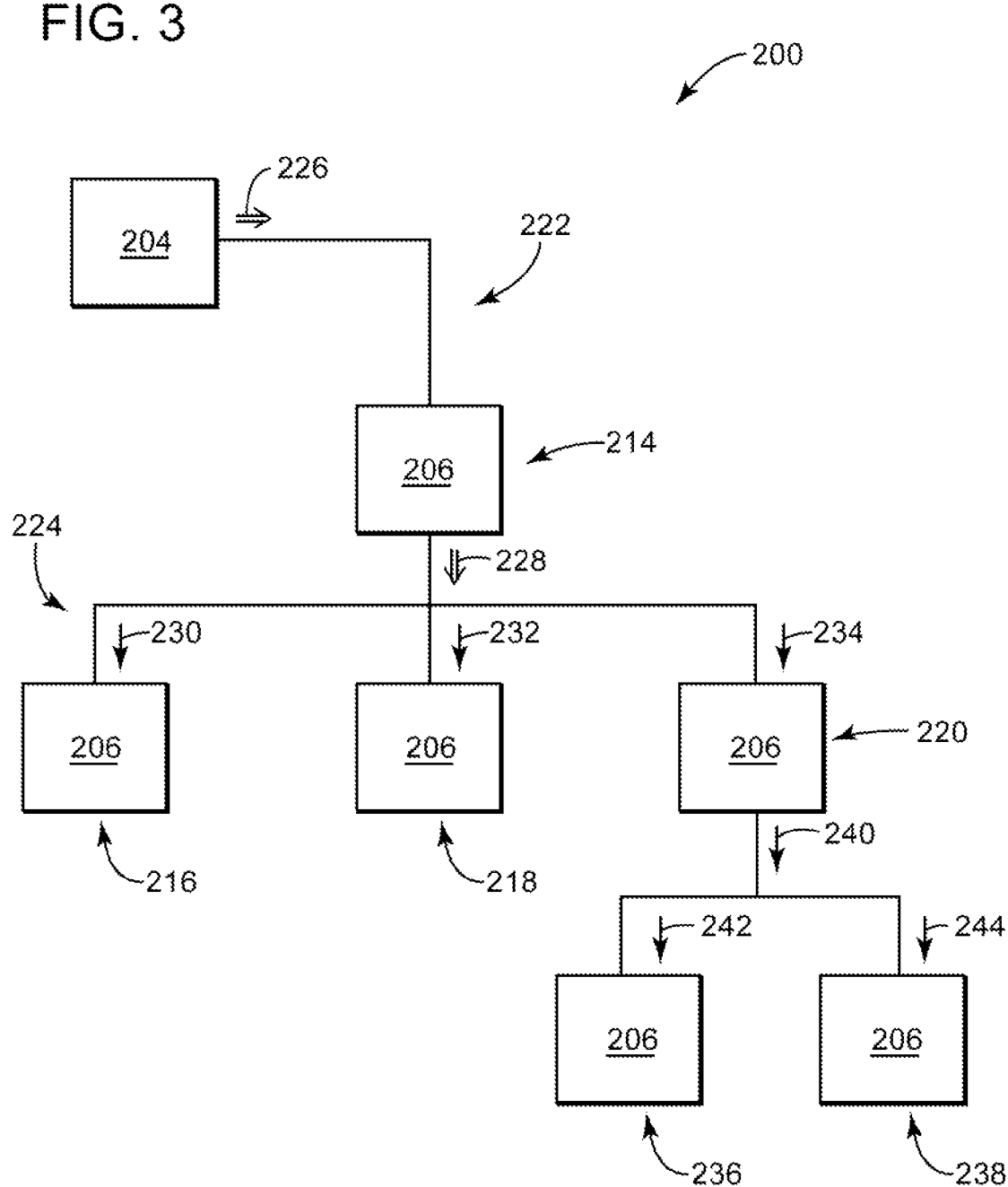
FIG. 3 depicts the system of FIG. 2 in a second configuration that has valve devices found in a process line.

In FIG. 3, the system 200 forms a multi-layer structure that can utilize the update processes disclosed herein. This structure uses one of the target devices (e.g., target device 220) to distributes updates to one or more additional target devices (e.g., a fourth target device 236 and a fifth target device 238). In this scenario, the firmware component 234 comprises a secondary download package that can convey information to the target device 220. This target device 220 can process the information; and, in one example, generate an update output 240 that delivers a fourth firmware component 242 and a fifth firmware component 244.

Figure 4:
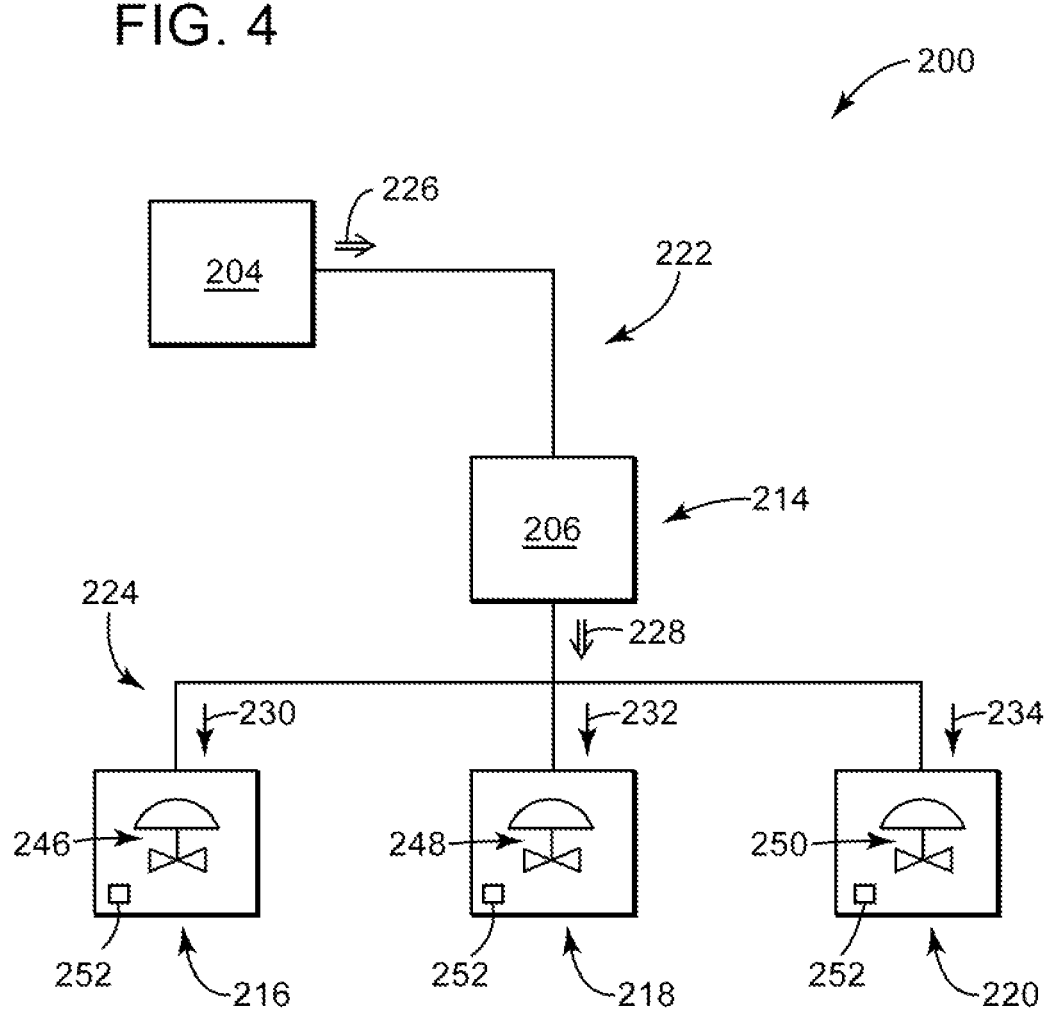
FIG. 4 depicts the system of FIG. 2 in a third configuration that directs firmware updates directly to the valve devices.

FIG. 4 illustrates an example of the system 200 that provides updates to control valves and related flow regulating devices. In this example, the target devices 216, 218, 220 take the form of a valve device (e.g., a first valve device 246, a second valve device 248, and a third valve device 250) with operative hardware 252. The valve devices 246, 248, 250 include devices that integrate into the process line. These devices can regulate a flow of working fluid (e.g., gas and liquid); although this disclosure covers both flow controls and fluid-related devices as well as other devices that may be found as part of process facilities or plants.

Figure 11:
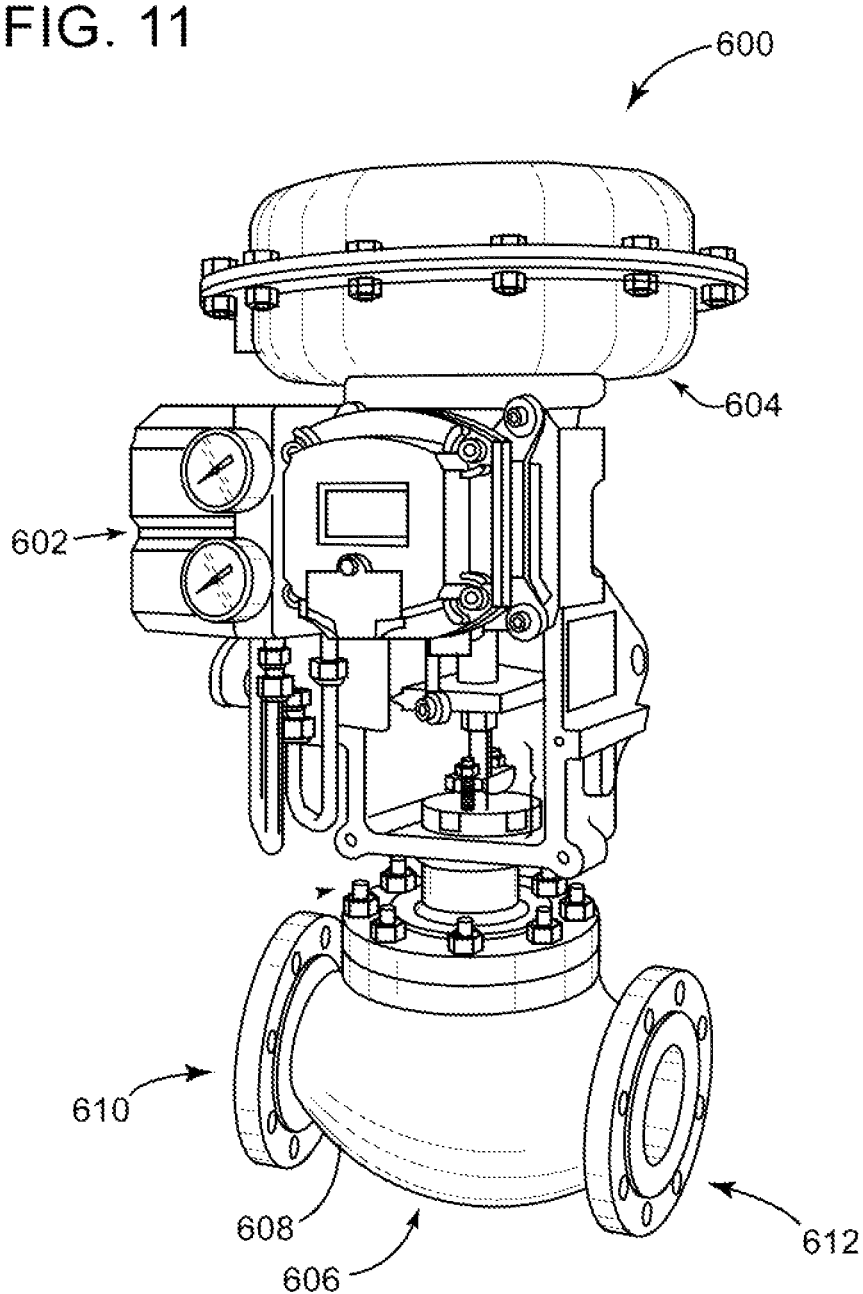
FIG. 11 depicts a perspective view of an examples of a valve device.
Figure 12:
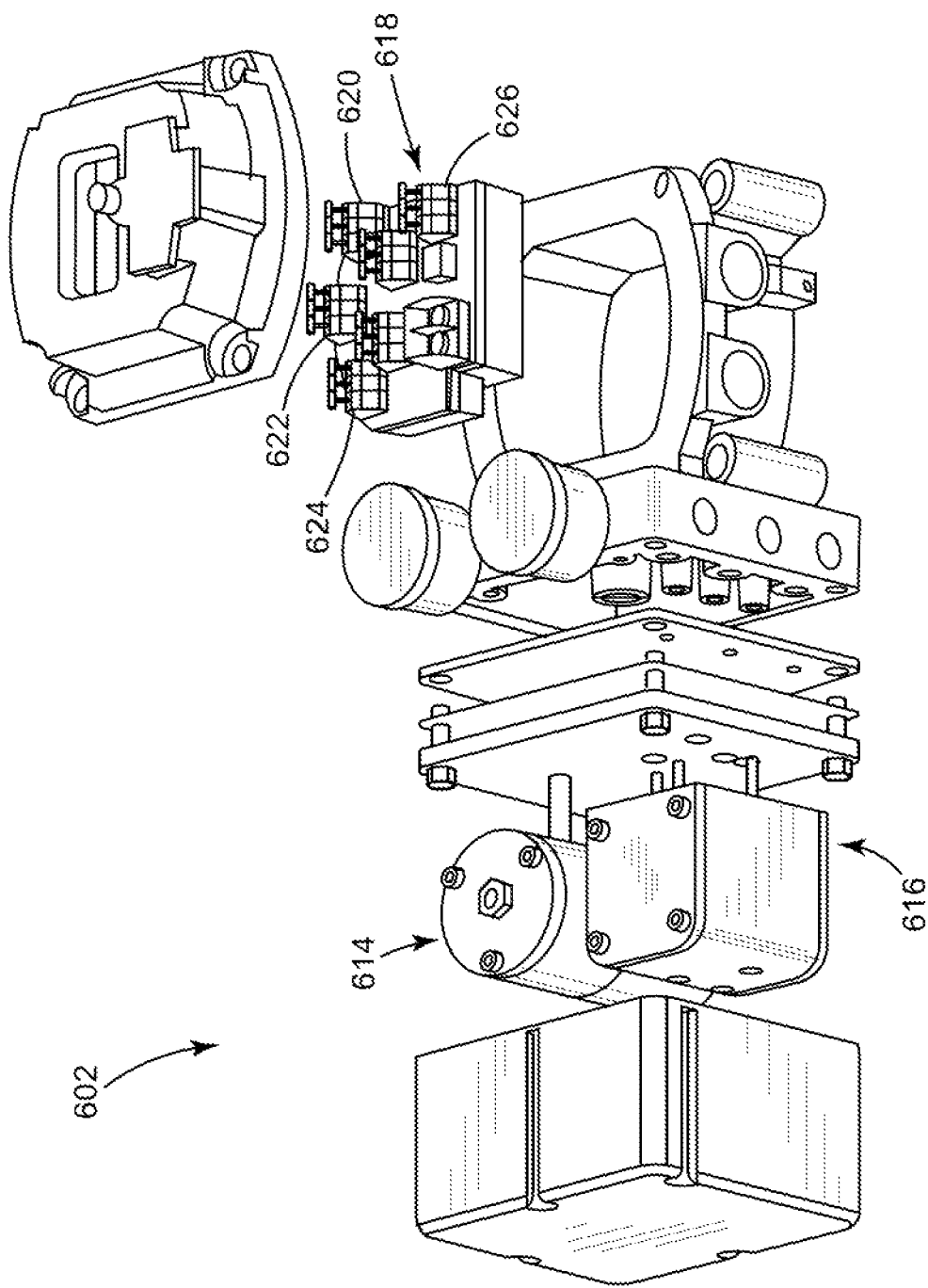
FIG. 12 depicts a perspective, exploded assembly view of an example of operative hardware for use to operate the valve device of FIG. 11.

For flow control, the regulating devices may embody control valves with a valve positioner, or like device, that incorporates one or more components of the operative hardware 252. These components include one or more processors, memories, and circuitry to facilitate operation of the control valve; although, the hardware may also be found separate from the control valve as well. An example of a control valve is illustrated in FIGS. 11 and 12 and discussed more below.

Figure 5:
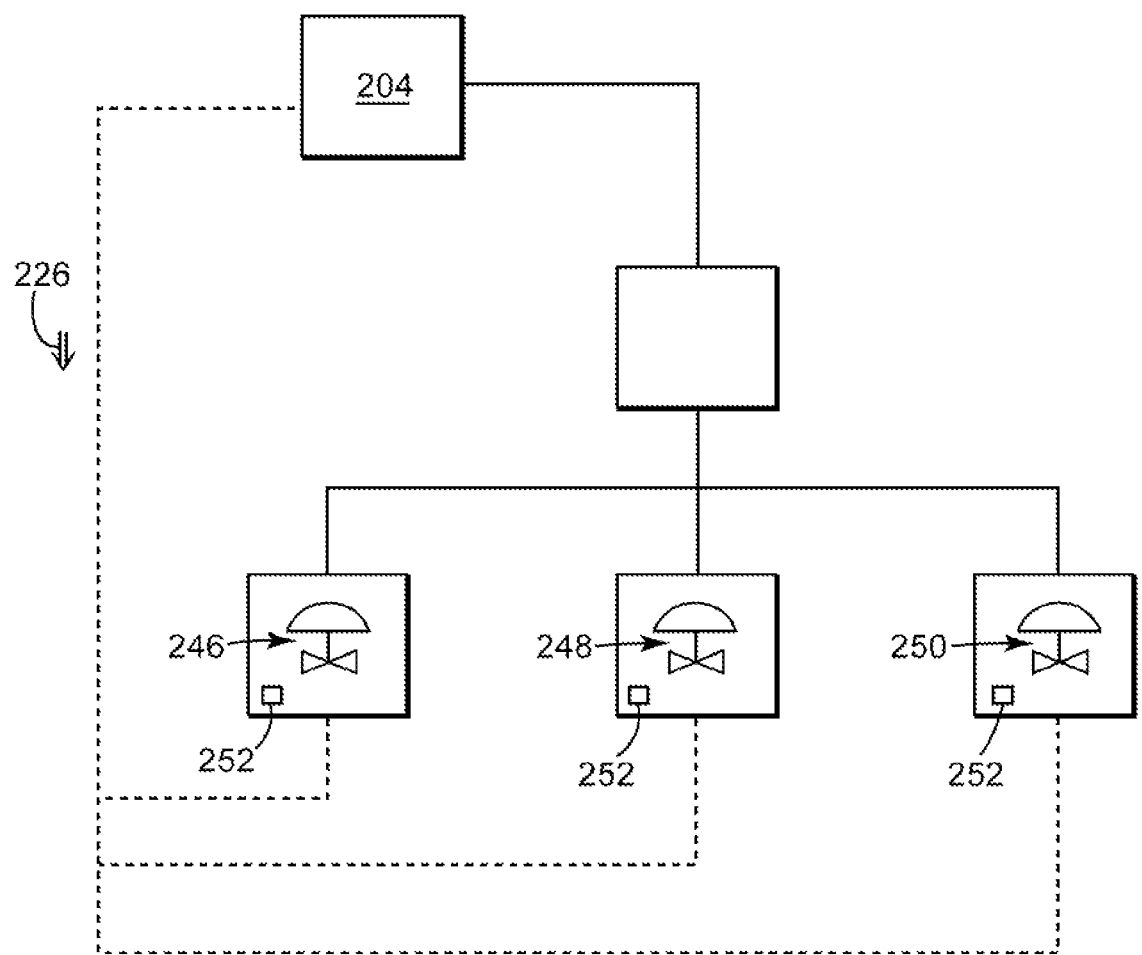
FIG. 5 depicts the system of FIG. 2 in a fourth configuration that directs firmware updates directly to the valve devices
Figure 6:
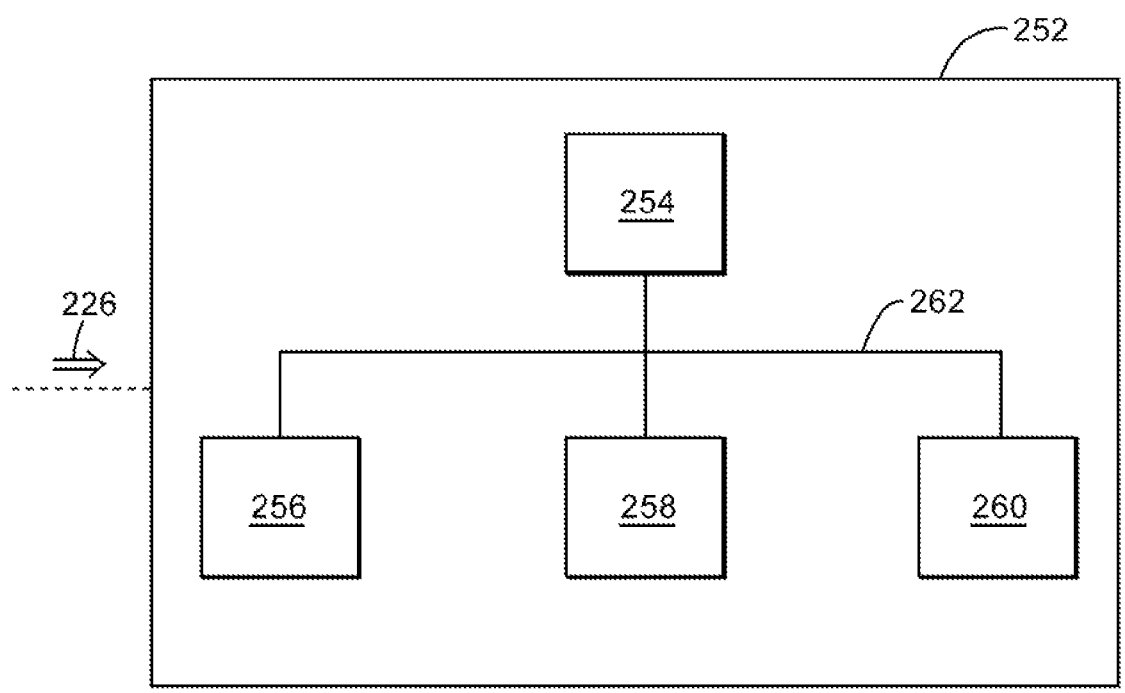
FIG. 6 depicts an example of operative hardware that can operate the valve devices of the systems in FIGS. 3, 4, and 5.

FIG. 5 illustrates a configuration in which the host device 204 couples with the valve devices 246, 248, 250 to deliver the update input 226. This configuration can by-pass the receiving device 214 in lieu of delivery of the updates directly to the operative hardware 252 on the valve devices 246, 248, 250. This type of delivery is useful to direct updates for various components found on a single target device. To illustrate, and as best shown in FIG. 6, the operative hardware 252 can have one or more processing units (e.g., a first processing unit 254, a second processing unit 256, a third processing unit 258, and a fourth processing unit 260). Busses 262 couple the processing units 254, 256, 258, 260 together to allow for the exchange of data and information. In one implementation, one of the processing units 254, 256, 258, 260 can operate as the receiving device (e.g., the first processing unit 254) to process the update input 226 in order to deliver the firmware components to the appropriate target devices (e.g., processing units 256, 258, 260).

As noted above, examples of the update input 226 can include data that conveys the updates to the executable instructions across multiple process devices in the process line. This data may code a plurality of firmware components (e.g., the first firmware component and the second firmware component) for on the target devices (e.g., a first target device and a second target device). The firmware components may be different from one another, e.g., the executable instruction of the first firmware component are different from the executable instruction of the second firmware component.

Figure 7:
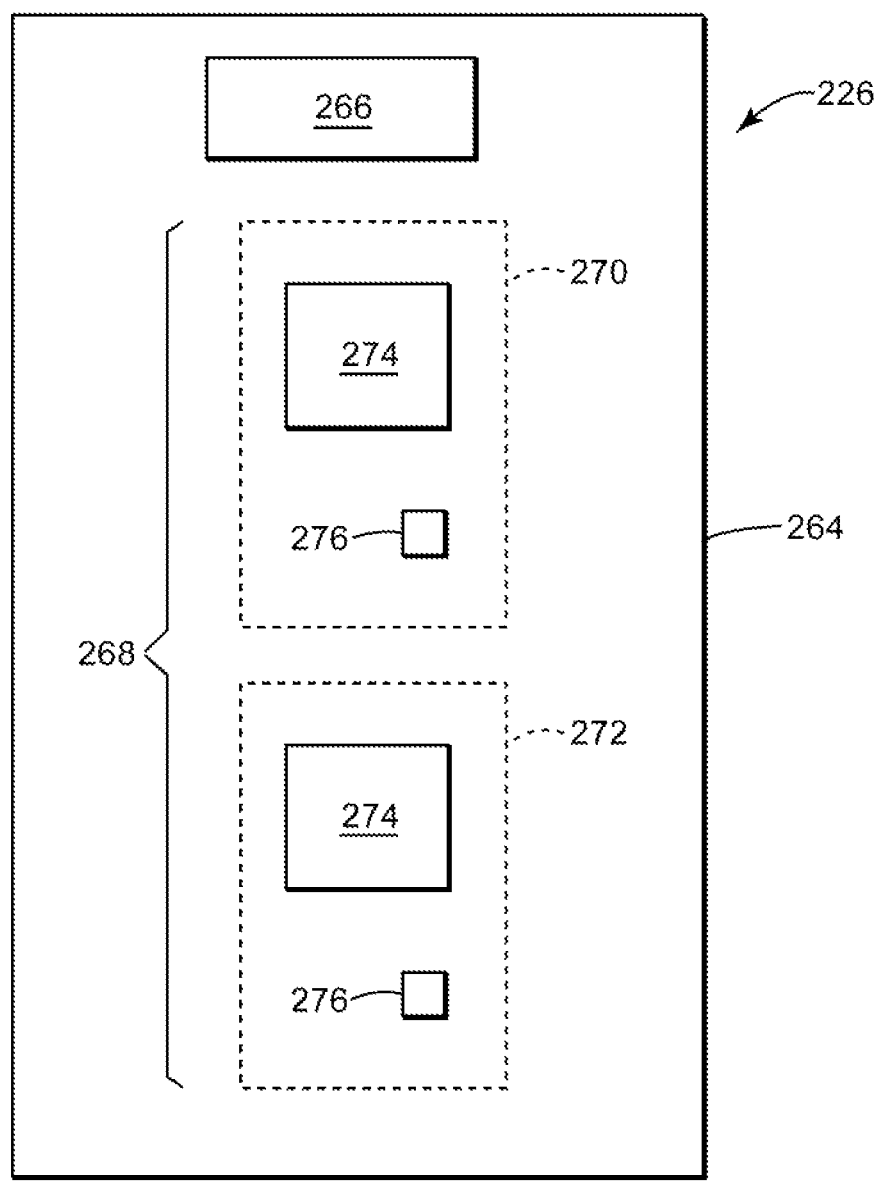
FIG. 7 depicts a schematic diagram of an update input that can convey data and information to facilitate firmware updates across multiple devices.

FIG. 7 illustrates details of one example of the update input 226 that can convey data and information to update executable instructions across devices in a process facility or plant. The update input 226 includes a download package 264 with various content in the form of one or more download components (e.g., a first download component 266 and a second download component 268). These components 266, 268 can incorporate one or more firmware packages (e.g., a first firmware package 270 and a second firmware package 272) that have a descriptive component 274 and an instruction component 276.

Examples of the download package 264 may incorporate data and information necessary to perform software and firmware updates across process devices in a process line. Creation of the executable instructions that make up the firmware packages 270, 272 can occur off-line, e.g., by one or more developers that provide support to the same and/or different models, styles, and/or types of the processing devices. The developers (and/or associated individual and/or entity) can deliver the firmware packages 270, 272 to the controlling entity of the process line. Delivery can occur via non-transitory computer readable medium (e.g., a disk and/or flash drive), as well as by download/uploading via various networking protocols.

The firmware components 270, 272 can include executable instructions that are consistent with executable instructions that instruct operation of the target devices. In one implementation, these executable instructions can incorporate instructions found in the firmware of the target devices. This configuration of the firmware components 270, 272 can update the entirety of the firmware that instructs operation of the target device. In other implementations, one or more of the firmware components may include executable instructions for only a part, or sub-component, of the executable instructions that instruct operation of the target devices. This sub-component can target only certain functions of the firmware; thereby updating only a portion of the firmware that is used by the target device.

The data and information in the download package 264 can use various parameters to identify the components and other features of the information found therein. These parameters can convey to the various devices, e.g., the receiving device, the content of the download package; this feature can allow the receiving device to distribute the firmware components to the appropriate devices. Generally, the parameters can take the form of software variables (known and/or unique) and/or other identifiers, nomenclature, and like configurations and arrangements of software language that can instruct as to the content of the download package 258. Package descriptors in the first download component 266, for example, can describe the contents of the download package 264. Examples of the package descriptors can identify the size of the package, the number of firmware components and/or firmware packages, and the destination and/or subject device(s) that will distribute the firmware updates. The second download component 268 may include one or more firmware descriptors that further granulate the information to identify features and aspects of the executable instruction that can make-up at least part of the firmware packages 270, 272. These features can instruct the receiving devices to perform appropriate distribution of the firmware updates. Examples of the firmware descriptors can identify the size of the firmware, the version of the firmware, and the target device.

Figure 8:
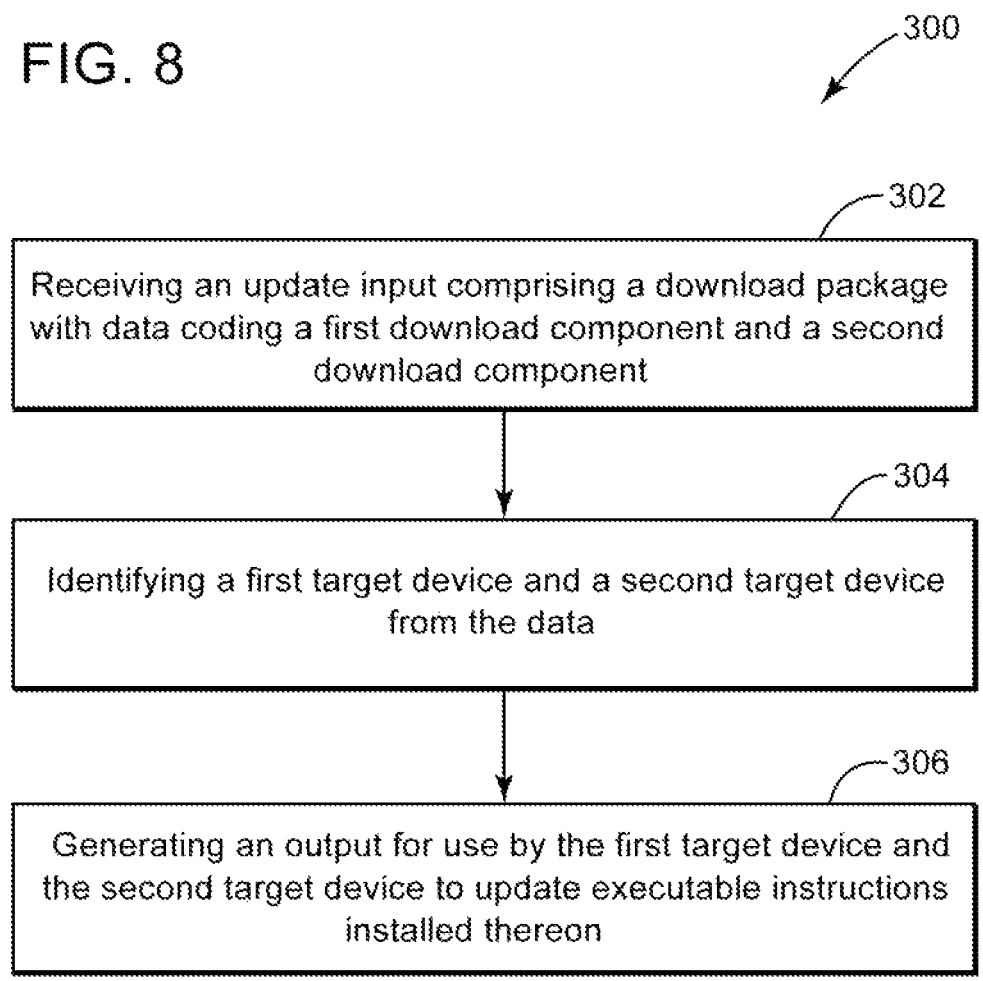
FIG. 8 depicts a flow diagram of an exemplary embodiment of a method for updating firmware across multiple devices.
Figure 9:
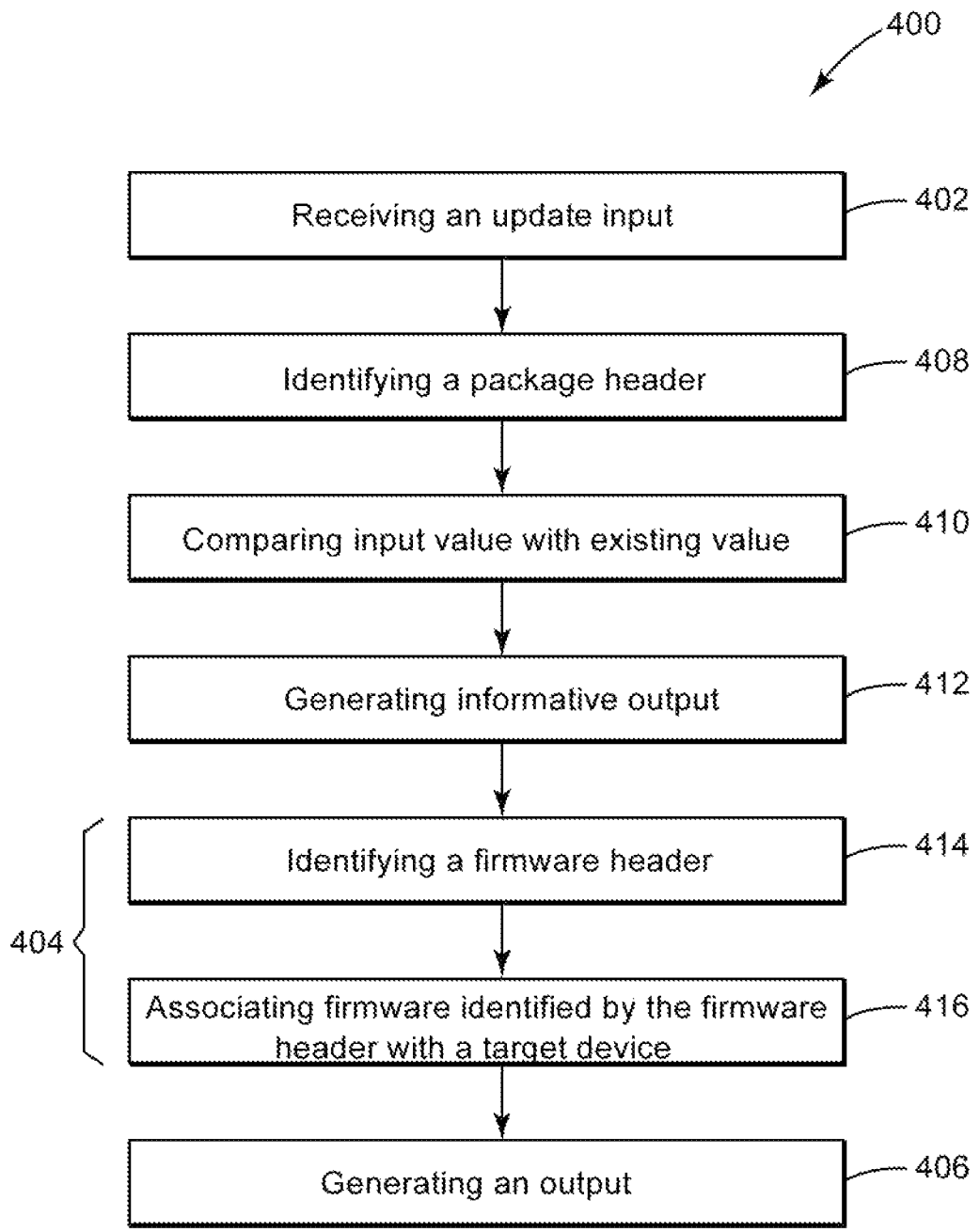
FIG. 9 depicts a flow diagram of an exemplary embodiment of a method for updating firmware across multiple devices.
Figure 10:
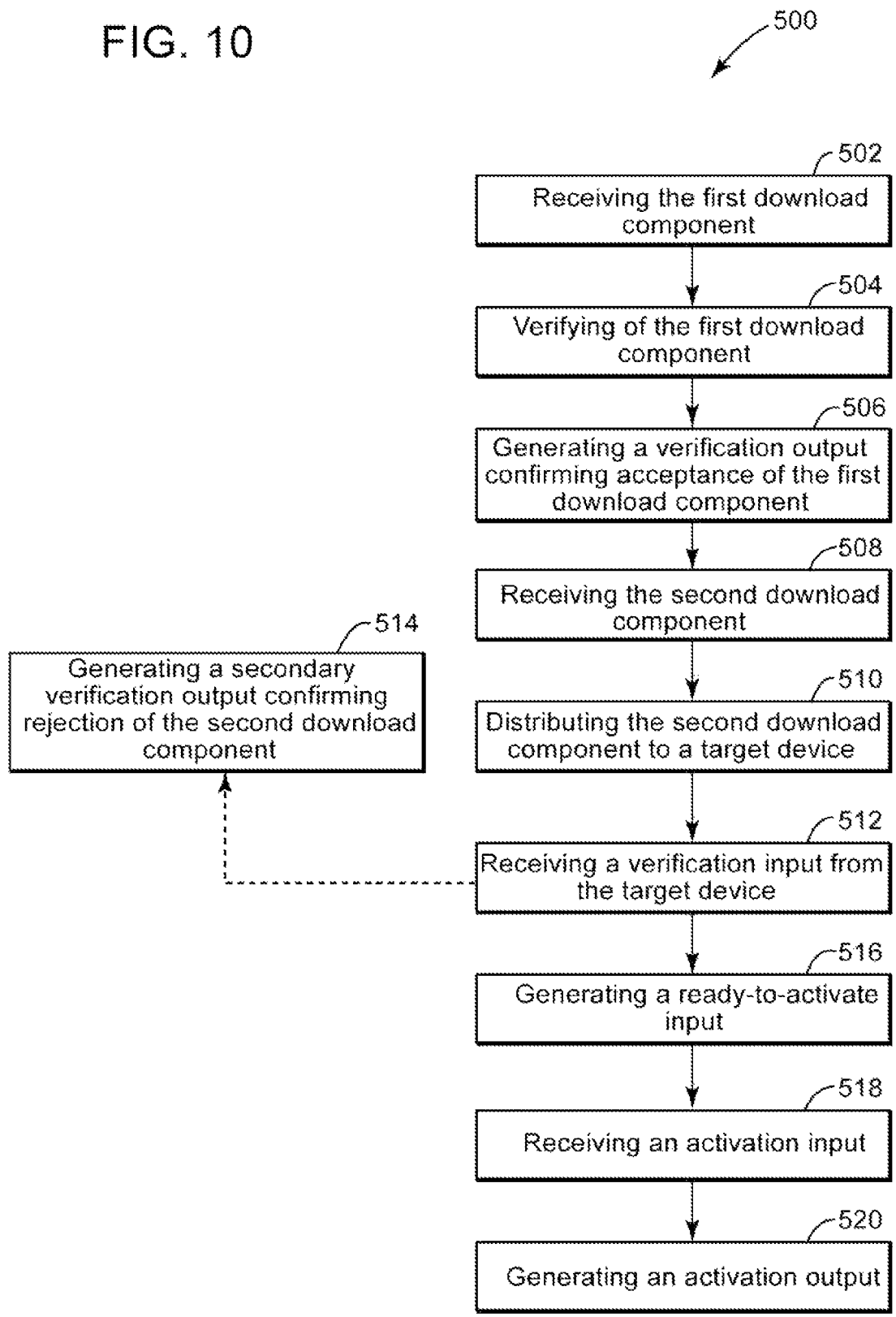
FIG. 10 depicts a flow diagram of an exemplary embodiment of a method for updating firmware across multiple devices.

FIGS. 8, 9, and 10 depict flow diagrams of exemplary embodiments of computer-implemented methods. Collectively, one or more of the steps of the methods can be coded as one or more executable instructions (e.g., hardware, firmware, software, software programs, etc.). These executable instructions can be part of a computer-implemented method and/or program, which can be executed by a processor and/or processing device. The processor may be part of the transaction gateway component, which is adapted to execute these executable instructions, as well as to process inputs and to generate outputs, as set forth herein.

FIG. 8 depicts a flow diagram of an exemplary embodiment of a computer-implemented method 300 for updating firmware across one or more devices (e.g., process devices 106, 206 of FIGS. 1, 2, 3, 4, and 5) in process plants or facilities. This embodiment is useful to configure the receiving device to deliver firmware updates to different process devices using the single domain configuration of the FOUNDATION Fieldbus protocol. As shown in FIG. 8, the method 300 includes, at step 302, receiving, at a processor, an update input comprising a download package with data comprising a first download component and a second download component and, at step 304, identifying, with the processor, a first target device and a second target device from the data. The method 300 also includes, at step 306, generating, with the processor, an output for use by the first target device and the second target device to update executable instructions installed therein.

The step of receiving the update input (e.g., at step 302) may occur at one or more components that the process line incorporates and/or couples with, e.g., at the process facility or plant. These components include the central processing device(s) that controls operation of the process line to execute the process. In other examples, the operative device that executes all and/or part of the method 300 is found on the process line. Examples of this operative device are often outfit with hardware to transmit and receive data, e.g., by way of one or more of the communication protocols the process facility or plant uses to exchange signals among the process device. Collectively, the operative device(s) (whether the central processing device(s) or processing device(s)) can utilize various executable instructions (e.g., in the form of software, firmware, computer programs, and the like) that process the update input to effectively deliver the output to the target device(s).

The step of identifying the first target device and the second target device (e.g., at step 304) can coordinate delivery of the firmware updates to specific components in the process line. This step may utilize various parameters of the download package. For example, the receiving device can read various descriptors that are used to identify the firmware in the download package and to associate the firmware with one or more particular target devices. In one embodiment, the method 300 can include one or more steps for accessing a listing and/or table with data that identifies one or more target devices that connect with the receiving device. Use of this data can allow the receiving device to direct the first firmware component and the second component to the appropriate target device.

The step of generating the output (e.g., at step 306) can deliver the firmware component according to the appropriate associations and/or identifications discussed above. Examples of the output can include data comprising the executable instructions for updated firmware. For implementations that update multiple firmware for different devices, this feature can speed up the distribution of the firmware from a single device (i.e., the receiving device) to a plurality of processing devices (e.g., the first target device and the second target device).

The method 300 can also include steps that direct the exchange of data (e.g., as the input and/or update input) between the host device and the receiving device and the receiving device and the target device. For example, the method 300 may include one or more steps for receiving an activation input and, further, for using the output to distribute the activation input to the target devices. Generally, the activation input can instruct one or more, or all, of the target devices to install the firmware component. In one implementation, the activation input can include a first activation input that instructs the first target device and a second activation input that instructs the second target device. Use of the different activation inputs (e.g., the first activation input and the second activation input) allows for updates to occur on a device-by-device basis; this approach is different from conventional activation that requires all and/or substantially all of the devices to undergo certain reset and/or update operations that can take devices offline that are not part of the update process.

Other steps of the method 300 may exchange data that verifies certain aspects of the download process. These steps may include, for example, one or more steps for receiving a verification input with data that confirms certain characteristics of the firmware component relative to the target device. In one example, the data can confirm the integrity of the firmware component; for example, the data confirms that the firmware is complete and devoid of errors that could render the firmware ineffective and/or inoperable and/or uninstallable. In another example, the data can confirm that the firmware component is appropriate for the target device, e.g., that the firmware component is used for the type, style, and configuration of the target device. In yet another example, the data can confirm that the version of the firmware component is appropriate for the target device.

FIG. 9 illustrates a flow diagram of an exemplary embodiment of a computer-implemented method 400 with additional details useful for the receiving device to update firmware across numerous devices in a process line. The method 400 includes, at step 408, identifying a package header and, at step 410, comparing an input value for a parameter in the package header (e.g., download component 266 of FIG. 7) with an existing value for the parameter accessible by the receiving device. The method 400 can also include, at step 412, generating an informative output that can confirm features of the updated firmware. For example, if the input value is the same as the existing value, then the informative output can indicate that the update should not continue. On the other hand, if the input value is different from the existing value, then the method 400 can continue, at step 404, identifying a target device. In one embodiment, the method 400 can include, at step 414, identifying a firmware header and, at step 416, associating firmware identified by the firmware header with a target device. The method 400 can also include, at step 406, generating an output to deliver the firmware to the target device.

The package header can convey information about the update firmware to the receiving device. This information can utilize various sub-headers, e.g., a first header (also "domain header") and a second header (also "a private header"). These sub-headers are useful to characterize the content of the download package and the various firmware updates that the update input will include for the receiving device to distribute to the target devices.

Table 1 below illustrates an example of the parameters that can be found in a domain header.

TABLE 1

Domain Header
Parameter (also, "Attribute")

Manufacturer ID
Device Family
Device Type
Device Revision
DD Revision
Software Revision
Software Name
Domain Name Broadly, parameters found in the domain header (also "domain parameters") can identify the destination for the download package. The host device (e.g., 104, 204 of FIGS. 1, 2, 3, 4, and 5) can use the domain parameters, for example, to identify the destination, or receiving device, from among a listing of connected devices accessible to the host device. On the destination side, the receiving device (e.g., the receiving device 214 of FIGS. 2, 3, and 4) can use the domain parameters to recognize the download package that accompanies the domain header is intended for the receiving device. The receiving device can compare values for the domain parameters, for example, to previously stored values for the domain parameters. In one example, the receiving device can generate an output that indicates to the host device that the receiving device has received the download package. This output can acknowledge receipt, as well as to indicate that receiving device rejects the download package, e.g., because it was improperly routed, contains improper firmware, etc.

Table 2 below illustrates an example of the parameters that can be found in a private header.

TABLE 2

Private Header
Parameter (also, "Attribute")

FF Firmware Version
APP Firmware Version

The parameters of the private header (also "private parameters") can define information about the firmware package(s). The receiving device can use this information to identify whether or not the firmware is correct and/or incorrect. For example, the receiving device can compare values for the private parameters to values that are pre-stored, e.g., in memory accessible to the receiving device. Values that deviate as between the private parameters and pre-stored parameters can indicate to the receiving device that the firmware package is an upgrade and/or update. As noted above, the receiving device can generate an output to convey the outcome of the comparison to the host device.

The firmware header can assume structures that convey information about the firmware components (e.g., the first firmware component and the second firmware component) that the download package is to distribute across the process devices. Table 3 below illustrates an example of the parameters that can be found in the firmware header.

TABLE 3

Firmware Header

| Parameter (also, "Attribute") |
| --- |
| Destination (Device address, name, type, etc.) |
| Address |
| Size |
| CRC |
| Relocation size |
| Relocation CRC |
| Compression method |

The parameters of the firmware header (also "firmware parameters") can identify the target device or device family that is to receive the updated firmware. This information can instruct the receiving device to properly distribute the firmware components to the appropriate target device.

FIG. 10 depicts a flow diagram of an exemplary embodiment of a method 500 that can illustrates the exchange of information between devices in the system to complete the update process. Examples of the method 500 find use with receiving devices that do not have enough memory to retain information on the scale required by the size of the update package. For these types of devices, the host device can deliver the components of the download package serially, starting for example with the first download component that defines the content of the download package. The method 500 can implement certain steps (also "verification" steps) can exchange information to indicate to the host device that the receiving device is ready to receive additional components, e.g., the firmware components. Further processing by the receiving device can distribute the firmware components as per the scope and spirit of the present disclosure. In one implementation, the receiving device can store the various update components and, in response to a signal from a connected device, can distribute the update components to the connected device. Storage can be indefinite, i.e., the receiving device will retain information to send to the newly connected device.

In FIG. 10, the method 500 includes, at step 502, receiving the first download component and, at step 504, verifying the first download component. The method 500 also includes, at step 506, generating a verification output comprising information that verifies acceptance and/or rejection of the first download component. Verification outputs that indicate rejection of the first download component can terminate the update process. On the other hand, if the receiving device accepts the first download component, then the method 500 can continue, at step 508, receiving the second download component and, at step 510, distributing the second download component to the appropriate target devices. The method 500 can also include, at step 512, receiving a verification input from the target devices comprising information that verifies acceptance and/or rejection of the second download component by the target devices. Again, rejection of the second download component can stall the update process. In one example in which the target devices rejects the second download component, the method 500 includes, at step 514, generating a secondary verification output that instructs the host device of the problems with the update processes at the target device. However, if the target device accepts the second download component, then the method 500 can continue, at step 508, to receive additional firmware components that need to be distributed to other target devices. If there are no additional firmware updates, the method 500 can continue, at step 514, generating a ready-to-activate input, which can instruct the host device that all of the updates have been distributed. In one embodiment, the method 500 can include, at step 516, receiving an activation input and, at step 518, generating an activation output that can instruct the target devices to install the various updated executable instructions.

FIGS. 11 and 12 illustrates an example of a control valve 600 for use as the processing devices (e.g., processing devices 102, 206 of FIGS. 1, 2, 3, 4, and 5) discussed above. In FIG. 11, the control valve 600 includes a valve positioner 602, an actuator 604, and a fluid coupling 606 with a body 608 that has a first inlet/outlet 610 and a second inlet/outlet 612. This structure is typical of devices that can modulate a flow of working fluid between the inlet/outlets 610, 612.

FIG. 12 depicts an example of the valve positioner 602 in exploded form. As shown in this diagram, the valve positioner 602 has a plurality of valve components (e.g., a converter component 614, a relay component 616, a processing component 618). The valve components 614, 616, 618 work in combination to maintain the position of a valve disposed in the body 608 (FIG. 11) to modulate fluid flow across the inlet/outlets 610, 612 (FIG. 11). In one example, the processing component 618 can include operative hardware (e.g., operative hardware 252 of FIGS. 5 and 6) with one or more processing units (e.g., a first processing unit 620, a second processing unit 622, a third processing unit 624, and a fourth processing unit 626).

Examples of the processing component 618 manage operation of the valve components 614, 616 to regulate flow of working fluid across the valve. These examples can comprise one or more discrete components (e.g., resistors, transistors, capacitors, etc.) including processing units 620, 622, 624, 626 that reside on one or more substrates (e.g., a printed circuit board). These components may include one or more processors (e.g., an ASIC, FPGA, etc.) that can execute executable instructions in the form of software, computer programs, and firmware. These executable instructions can be stored on memory. In one embodiment, the processing component 618 can include one or more programmable switches, inputs that couple with sensors for position feedback, a proportional-integral-derivative (PID) controller, a display (e.g., an LCD display), and like components that facilitate use and operation of the control valve 600 (FIG. 11).

During update processes, the processing component 618 can receive the download package at one of the processing units 620, 622, 624, 626. The effective receiving device (e.g., processing unit 620) can process the download package according to one or more of the steps this disclosure contemplates herein to distribute updates (e.g., firmware updates) to the appropriate processing units 622, 624, 626.

As set forth herein, examples of the various component (e.g., process devices 106, 306, 606 of FIGS. 1, 3, 4, and 5) like the control valve 600 (FIG. 10) can comprise processors and memory that can store and execute certain executable instructions, software programs, and the like. These devices can integrate into the process line and/or reside remote from the process line as a standalone computing device, network, and like computing arrangement. The memory and the processor can include hardware that incorporates with other hardware (e.g., circuitry) to form a unitary and/or monolithic unit devised to execute computer programs and/or executable instructions (e.g., in the form of firmware and software). In other examples, these devices integrate, in whole or in part, with components of the process devices and/or process line, e.g., as part of the hardware and/or software configured on such hardware.

The processing components may also have constructive components that can communicate, e.g., with the processor(s) and the memor(ies) and/or with other circuits (and/or devices), which execute high-level logic functions, algorithms, as well as executable instructions (e.g., firmware instructions, software instructions, software programs, etc.). Exemplary circuits of this type include discrete elements such as resistors, transistors, diodes, switches, and capacitors. Examples of a processor include microprocessors and other logic devices such as field programmable gate arrays ("FPGAs") and application specific integrated circuits ("ASICs"). Although all of the discrete elements, circuits, and devices function individually in a manner that is generally understood by those artisans that have ordinary skill in the electrical arts, it is their combination and integration into functional electrical groups and circuits that generally provide for the concepts that are disclosed and described herein.

The structure of the processing devices can permit certain determinations as to selected configuration and desired operating characteristics that an end user might convey via a graphical user interface or that are retrieved or need to be retrieved from the processing device. For example, the electrical circuits of these control devices can physically manifest theoretical analysis and logical operations and/or can replicate in physical form an algorithm, a comparative analysis, and/or a decisional logic tree, each of which operates to assign an output and/or a value to an output that correctly reflects one or more of the nature, content, and origin of the changes in data that are reflected by the inputs and outputs the processing device receives and/or generates during operation of the device (and process line) to perform the firmware updates contemplated herein In one embodiment, a processor can also include state machine circuitry or other suitable components capable of controlling operation of the components as described herein. Memory includes volatile and non-volatile memory and can store executable instructions in the form of and/or including software (or firmware) instructions and configuration settings. Examples of these devices can mount to substrates such as printed-circuit boards and semiconductors, which can accommodate various components including a processor, memory, and other related circuitry to facilitate operation, e.g., of the processing devices.

However, although processor, memory, and the components of control circuitry might include discrete circuitry and combinations of discrete components, this need not be the case. For example, one or more of these components can comprise a single integrated circuit (IC) or other component. As another example, a processor can include internal program memory such as RAM and/or ROM. Similarly, any one or more of functions of these components can be distributed across additional components (e.g., multiple processors or other components).

Moreover, as will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. Examples of a computer readable storage medium include an electronic, magnetic, electromagnetic, and/or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A non-transitory computer readable signal medium may include a propagated data signal with computer readable program code embodied therein, for example, in baseband or as part of a carrier wave. Such a propagated signal may take any of a variety of forms and any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language and conventional procedural programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Accordingly, a technical effect of embodiments of the proposed system and method is to expedite the distribution of executable instructions across a plurality of devices in a process line.

As used herein, an element or function recited in the singular and proceeded with the word "a" or "an" should be understood as not excluding plural said elements or functions, unless such exclusion is explicitly recited. Furthermore, references to "one embodiment" of the claimed invention should not be interpreted as excluding the existence of additional embodiments that also incorporate the recited features.

The invention is inclusive of combinations of the aspects described herein. References to "a particular aspect" and the like refer to features that are present in at least one aspect of the invention. Separate references to "an aspect" or "particular aspects" or the like do not necessarily refer to the same aspect or aspects; however, such aspects are not mutually exclusive, unless so indicated or as are readily apparent to one of skill in the art. The use of singular or plural in referring to "method" or "methods" and the like is not limiting. The word "or" is used in this disclosure in a non-exclusive sense, unless otherwise explicitly noted.

The invention has been described in detail with particular reference to certain preferred aspects thereof, but it will be understood that variations, combinations, and modifications can be effected by a person of ordinary skill in the art within the spirit and scope of the invention. Examples of variations, combinations, and modifications that are intended to be within the scope of the claims are those having structural elements that do not differ from the literal language of the claims and those including equivalent structural elements with insubstantial differences from the literal language of the claims.

What is claimed is:

1. A method for executing a firmware update across multiple devices, said method comprising:
   at a first valve positioner having a processor with access to memory:
     receiving, at the processor, an update input configured in a first networking protocol, the update input comprising a download package with data comprising a first download component identifying content of the download package and a second download component comprising a first firmware component and a second firmware component;
     utilizing the processor, identifying from the data, a second valve positioner and a third valve positioner that is different from the first valve positioner; and
     utilizing the processor, generating a first output and a second output, each configured in a second networking protocol that is different from the first networking protocol, the first output and the second output for use by, respectively, the second valve positioner and the third valve positioner, the first output comprising the first firmware component and the second output comprising the second firmware component,
   wherein the first networking protocol uses a first digital automation protocol and the second networking protocol uses a second digital automation protocol, which is different from the first digital automation protocol, to communicate among the first valve positioner, the second valve positioner, and the third valve positioner for factory automation.

2. The method of claim 1, wherein the first firmware component is different from the second firmware component.

3. The method of claim 1, wherein the second valve positioner and the third valve positioner form a device family.

4. The method of claim 1, further comprising:
   receiving an activation input; and
   generating an output, in response to the activation input, that is configured to instruct the second valve positioner and the third valve positioner to install, respectively, the first firmware component and the second firmware component.

5. The method of claim 4, further comprising:
   receiving a verification input comprising data about a status of one or more of the second valve positioner and the third valve positioner: and
   generating an output, in response to the verification input, that is configured to convey information that indicates the second valve positioner and the third valve positioner are ready to install, respectively, the first firmware component and the second firmware component.

6. The method of claim 1, wherein one or more of the first firmware component and the second firmware component comprise a secondary download package.

7. The method of claim 1, further comprising:
   comparing a value for a parameter in a first header component to a previously stored value for the parameter; and
   generating an output that is configured to convey information about the relation between the value and the previously stored value.

8. The method of claim 1, wherein one of the first firmware component and the second firmware component comprises executable instructions to update a sub-component of firmware that is running on the second valve positioner and the third valve positioner.

9. The method of claim 7, wherein the parameters comprise a domain parameter defined by the first networking protocol.

10. The method of claim 7, further comprising;
    comparing a value for a parameter in a second header component that is different from the first header component to a listing have a previously stored value for the parameter that identifies the one or more of the second valve positioner and the third valve positioner.

11. The method of claim 10, wherein the value of the parameter in the second firmware component describes a version value for the first firmware component and the second firmware component and the previously stored valve for the parameters describes the version value for firmware found on the second valve positioner and the third valve positioner.

12. A system for executing a process, said system comprising:
    a receiving device comprising a first valve positioner; and
    a plurality of target devices coupled with the receiving device, the plurality of target devices comprising a first target device and a second target device that is different from the first target device, each having a second valve positioner and a third valve positioner, respectively,
    wherein the first valve positioner comprises a first processing unit having access to executable instructions that are configured to be execute by the first processing unit, the executable instructions comprising one or more executable instructions for:

receiving an update input configured in a first networking protocol, the update input comprising a download package with data comprising a first download component identifying content of the download package and a second download component comprising a first firmware component and a second firmware component;

identifying, from the data, the first target device and the second target device; and generating a first output and a second output, each configured in a second networking protocol that is different from the first networking protocol, the first output and the second output for use by, respectively, the second valve positioner and the third valve positioner, the first output comprising the first firmware component and the second output comprising the second firmware component, wherein the first networking protocol uses a first digital automation protocol and the second networking protocol uses a second digital automation protocol, which is different from the first digital automation protocol, to communicate among the first valve positioner, the second valve positioner, and the third valve positioner for factory automation.

13. The system of claim 12, further comprising a host device coupled with the receiving device, wherein the host device distributes the update input to the first valve positioner of the receiving device.

14. The system of claim 12, wherein the first target device and the second target device are remote from the receiving device.

15. A valve positioner, comprising:

a processing unit having access to executable instruction stored on memory and that are configured to be executed by the processing unit, the executable instruction comprising instructions for:

receiving an update input configured in a first networking protocol, the update input comprising a download package with data comprising a first download component identifying content of the download package and a second download component comprising a first firmware component and a second firmware component;

identifying, from the data, the first target device and the second target device; and generating a first output and a second output, each configured in a second networking protocol that is different from the first networking protocol, the first output and the second output for use by, respectively, the first target device and the second target device, the first output comprising the first firmware component and the second output comprising the second firmware component, wherein the first networking protocol uses a first digital automation protocol and the second networking protocol uses a second digital automation protocol, which is different from the first digital automation protocol, to communicate with a second valve positioner and a third valve positioner on, respectively, of the first target device and the second target device for factory automation.

16. The valve positioner of claim 15, further comprising:

receiving an activation input; and generating an output, in response to the activation input, that is configured to instruct the second valve positioner and the third valve positioner to install, respectively, the first firmware component and the second firmware component.

17. The valve positioner of claim 16, further comprising:

receiving a verification input comprising data about a status of one or more of the first target device and the second target device: and generating an output, in response to the verification input, that is configured to convey information that indicates the second valve positioner and the third valve positioner are ready to install, respectively, the first firmware component and the second firmware component.

* * * * *